United States Patent
Park et al.

(10) Patent No.: US 8,635,274 B2
(45) Date of Patent: Jan. 21, 2014

(54) VIDEO CONFERENCING USING WHITE BOARD

(75) Inventors: Kum-Rye Park, Suwon-si (KR); Seong-Joon Jeon, Yongin-si (KR); Myeon-Kee Youn, Incheon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 565 days.

(21) Appl. No.: 11/526,026

(22) Filed: Sep. 25, 2006

(65) Prior Publication Data

US 2007/0168423 A1    Jul. 19, 2007

(30) Foreign Application Priority Data

Jan. 18, 2006 (KR) .................. 10-2006-0005169

(51) Int. Cl.
*G06F 15/16* (2006.01)

(52) U.S. Cl.
USPC ......................... 709/204; 709/224; 370/260

(58) Field of Classification Search
USPC ............................................ 709/204
See application file for complete search history.

(56) References Cited

U.S. PATENT DOCUMENTS

| | | | | | |
|---|---|---|---|---|---|
| 4,574,350 | A | * | 3/1986 | Starr | 710/200 |
| 4,604,694 | A | * | 8/1986 | Hough | 710/200 |
| 5,008,853 | A | * | 4/1991 | Bly et al. | 715/751 |
| 5,339,388 | A | * | 8/1994 | Bates et al. | 715/742 |
| 5,526,524 | A | * | 6/1996 | Madduri | 710/200 |
| 5,617,539 | A | * | 4/1997 | Ludwig et al. | 709/205 |
| 6,335,739 | B1 | * | 1/2002 | Matsukura et al. | 715/755 |
| 6,437,818 | B1 | * | 8/2002 | Ludwig et al. | 348/14.09 |
| 6,529,905 | B1 | * | 3/2003 | Bray et al. | 1/1 |
| 6,584,493 | B1 | * | 6/2003 | Butler | 709/204 |
| 6,624,827 | B1 | * | 9/2003 | Hwang et al. | 715/753 |
| 7,426,191 | B2 | * | 9/2008 | Salesky et al. | 370/260 |
| 2002/0016861 | A1 | * | 2/2002 | Simonoff | 709/250 |
| 2002/0154210 | A1 | * | 10/2002 | Ludwig et al. | 348/14.08 |
| 2003/0069931 | A1 | * | 4/2003 | Omura et al. | 709/205 |
| 2003/0093457 | A1 | * | 5/2003 | Goldick | 709/104 |
| 2003/0187860 | A1 | * | 10/2003 | Holland | 707/100 |

(Continued)

FOREIGN PATENT DOCUMENTS

| | | | | | |
|---|---|---|---|---|---|
| JP | 08018942 | A | * | 1/1996 | H04N 7/15 |
| JP | 09200351 | A | * | 7/1997 | H04M 3/56 |

(Continued)

OTHER PUBLICATIONS

Korean Office action corresponding to Korean Patent Application No. 10-2006-0005169, issued on Feb. 14, 2007.
Korean Decision of Grant issued on Jun. 20, 2007 in the corresponding Korean Patent application No. 10-2006-0005169.

*Primary Examiner* — Hamza Algibhah
(74) *Attorney, Agent, or Firm* — H.C. Park & Associates, PLC

(57) ABSTRACT

In a video conference system and method, a first terminal and second through Nth terminals maintain a session for a conference. The first terminal prevents an input of further information to the white board by the second through Nth terminals during a set time period from an input of information to the white board and the second through Nth terminals transmit further information, input during a buffering mode selected in an unlocked state, to other terminals participating in the session upon the input of information to the white board being allowed after the set time period has elapsed.

16 Claims, 3 Drawing Sheets

(56) References Cited

U.S. PATENT DOCUMENTS

| | | | |
|---|---|---|---|
| 2004/0230560 A1* | 11/2004 | Elza et al. | 707/1 |
| 2005/0169197 A1* | 8/2005 | Salesky et al. | 370/260 |
| 2005/0213731 A1* | 9/2005 | Rodman et al. | 379/202.01 |
| 2005/0213738 A1* | 9/2005 | Rodman et al. | 379/202.01 |
| 2005/0213739 A1* | 9/2005 | Rodman et al. | 379/202.01 |
| 2005/0216503 A1* | 9/2005 | Charlot et al. | 707/103 R |
| 2005/0289143 A1* | 12/2005 | Oshri et al. | 707/8 |
| 2006/0080432 A1* | 4/2006 | Spataro et al. | 709/224 |
| 2006/0129627 A1* | 6/2006 | Phillips et al. | 709/200 |
| 2006/0150108 A1* | 7/2006 | Adachi et al. | 715/750 |
| 2008/0147806 A1* | 6/2008 | Robbie et al. | 709/206 |

FOREIGN PATENT DOCUMENTS

| | | | | |
|---|---|---|---|---|
| JP | 2005222507 A * | 8/2005 | | G06F 3/03 |
| KR | 1019980027902 | 7/1998 | | |
| KR | 10-0198715 | 3/1999 | | |
| KR | 100198715 | 3/1999 | | |
| KR | 1020010078410 | 8/2001 | | |
| KR | 1020010096407 | 11/2001 | | |
| KR | 1020020048098 | 6/2002 | | |
| KR | 1020050046029 | 5/2005 | | |

* cited by examiner

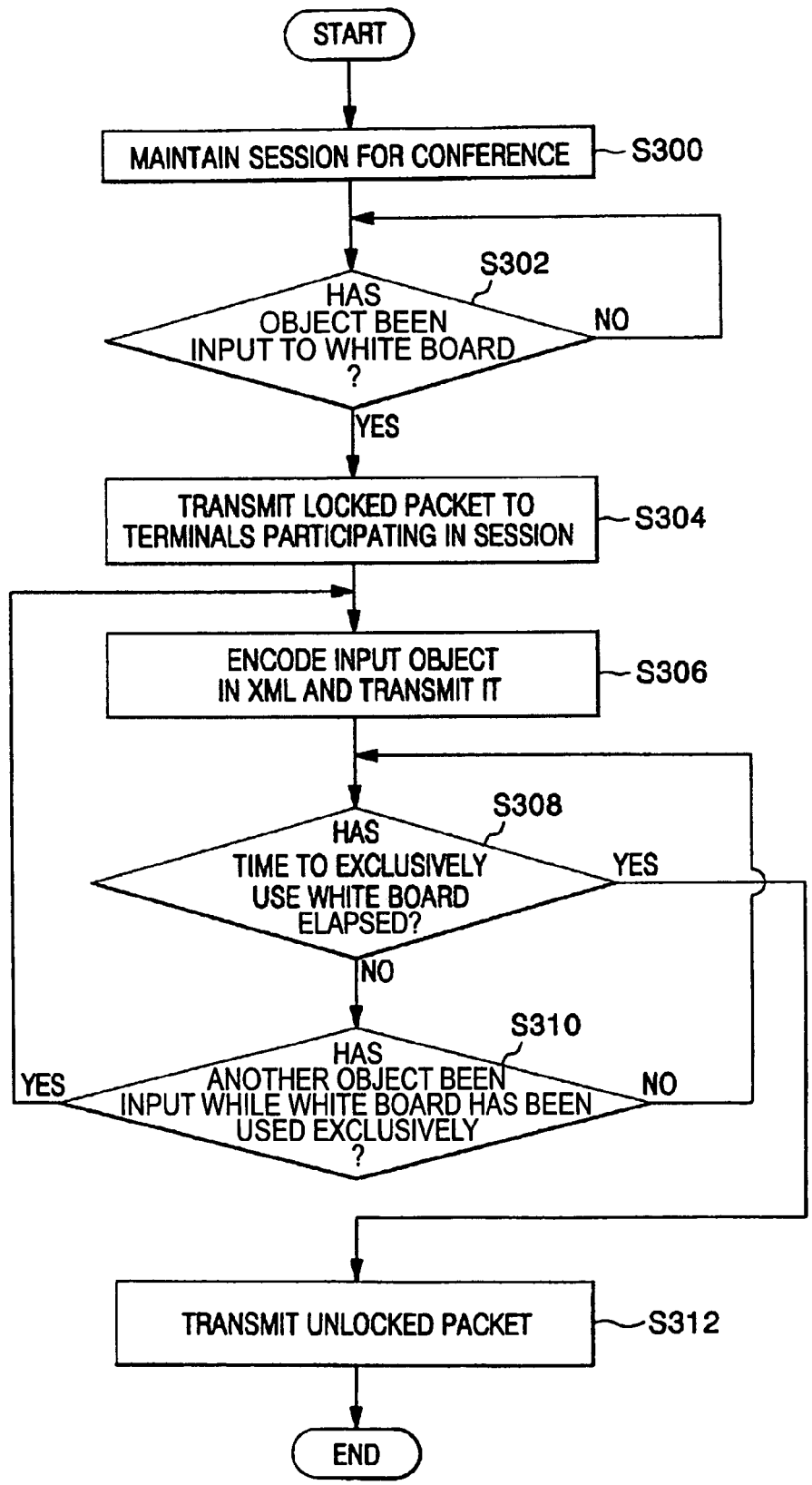

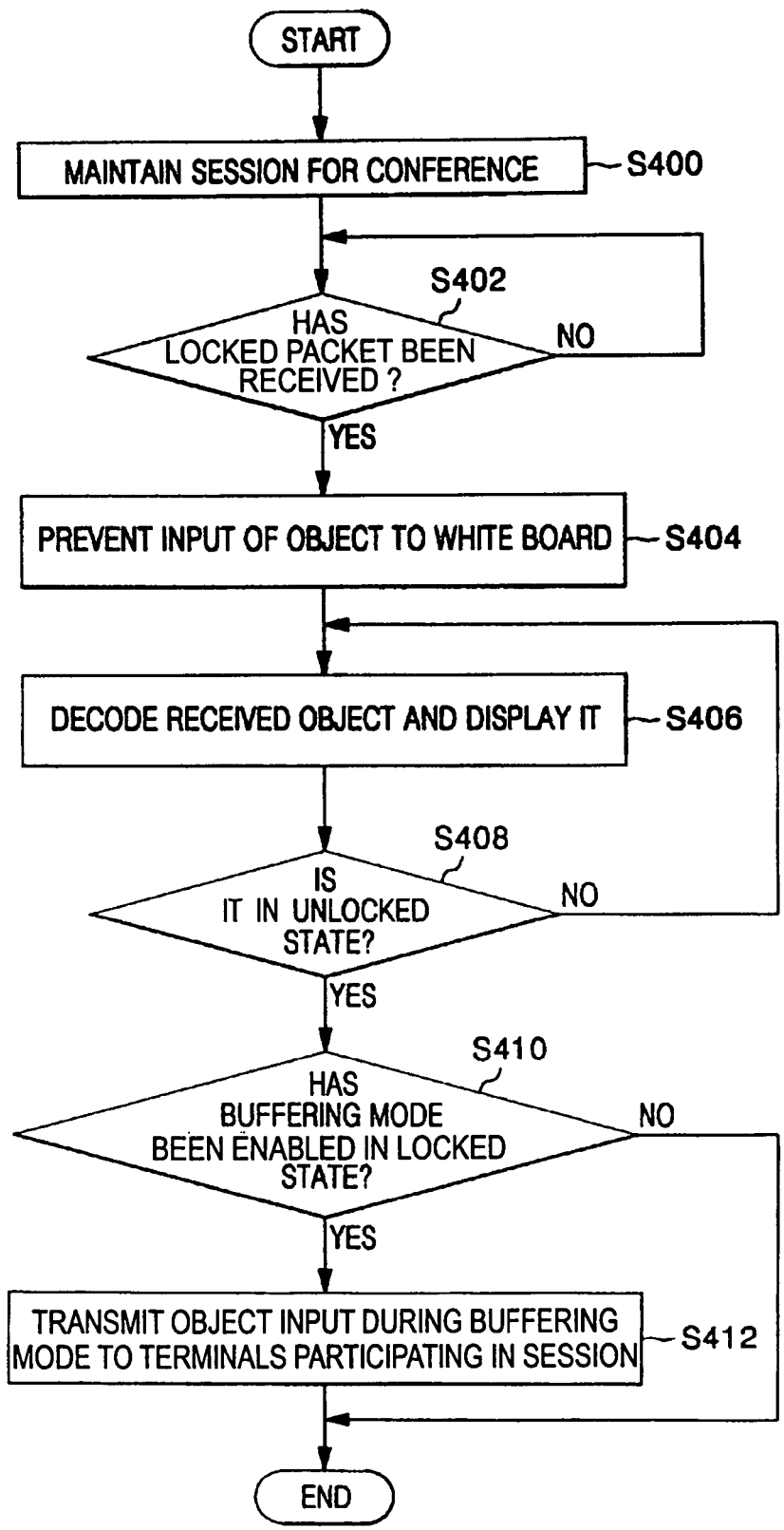

VIDEO CONFERENCING USING WHITE BOARD

CLAIM OF PRIORITY

This application makes reference to, incorporates the same herein, and claims all benefits accruing under 35 U.S.C. §119 from an application for VIDEO CONFERENCE SYSTEM AND METHOD USING WHITE BOARD earlier filed in the Korean Intellectual Property Office on the 18 Jan. 2006 and there duly assigned Serial No. 10-2006-0005169.

BACKGROUND OF THE INVENTION

1. Field of the Invention

The present invention relates to a video conference system and method using a white board, and more particularly, to a video conference system and method using a white board to transmit information between participants.

2. Description of the Related Art

A Wireless Broadband Internet system enables terminals, including notebooks, Personal Digital Assistants (PDAs), smart phones, etc. which use a 2.3 GHz frequency band to receive wireless Internet service anytime, anywhere, whether at rest or in motion (over 60 Km/hr).

Currently, as multimedia communication services are increasing in popularity, a video conference system which enables a plurality of participants in remote areas to join a conference through the Wireless Broadband Internet system is being provided.

In other words, the video conference system is configured to enable a group of people to participate in a video conference through the Wireless Broadband Internet system, and the video conference can be conducted by delivering conference information such as voice and images to participants.

In addition, by adding a white board function to the video conference system, participants in the video conference can record conference content through the white board and transmit the content to other participants.

The white board function refers to a function which enables picture drawing, document editing, etc., bidirectionally through an arbitrary application shared by a plurality of terminals.

In other words, the video conference system enables smooth communication between conference participants through the white board function when it is difficult for the participants to communicate through conference information, such as voice and images, etc.

However, an editing process on a white board shared by the video conference participants can be performed simultaneously by different participants, which can hinder communication between the participants.

Also, for smooth communication between participants of the video conference system, it is necessary to update information input to the white board.

However, since the terminal used in the video conference system captures an image on the white board and transmits information as images, there is a large quantity of data to be transmitted, which hinders smooth processing in real time.

SUMMARY OF THE INVENTION

It is an object of the present invention to provide a video conference system and method using a white board enabling a smooth multipoint conference.

In accordance with one aspect of the present invention, a terminal participating in a session maintained by at least two terminals in a video conference system using a white board is provided, the terminal including: a controller, the controller adapted to: request other terminals participating in the session to prevent input of further information to the white board during a set first time period from when information has been input to the white board by the terminal; and to select a buffering mode and to transmit further information to the other terminals participating in the session upon the input of information to the white board being allowed after a set second time period has elapsed upon receiving the request to prevent input of further information to the white board during the set second time period.

The controller is preferably adapted to encode the information input to the white board and the further information input during the buffering mode in extensible Markup Language (XML), and to transmit the encoded information to the terminals participating in the session.

The controller with priority is preferably adapted to transmit the further information input during the buffering mode to the other terminals participating in the session after the set second time period has elapsed.

In accordance with another aspect of the present invention, a video conference system using a white board is provided, the system including: a first terminal and second through Nth terminals adapted to maintain a session for a conference; the first terminal is adapted to prevent input of further information to the white board by the second through Nth terminals during a set time period from an input of information to the white board; and the second through Nth terminals are adapted to transmit further information, input during a buffering mode selected in an unlocked state, to other terminals participating in the session upon input of information to the white board being allowed after the set time period has elapsed.

The first terminal is preferably adapted to encode the information input to the white board in extensible Markup Language (XML) and to transmit the encoded information to the other terminals participating in the session, and the second through Nth terminals are preferably adapted to decode the information encoded in XML and output the decoded information.

The second through Nth terminals are preferably adapted to encode the further information in extensible Markup Language (XML) and to transmit the encoded information to the other terminals participating in the session, and the first terminal is preferably adapted to decode the information encoded in XML and to output the decoded information.

The second through Nth terminals with priority are preferably adapted to transmit the further information, input during the buffering mode, to the other terminals participating in the session upon input of information to the white board being allowed after the set time period has elapsed.

In accordance with yet another aspect of the present invention, a conference method of a terminal participating in a session maintained by at least two terminals in a video conference system using a white board is provided, the method including: requesting other terminals participating in a session to prevent input of further information to the white board during a set time period from when information has been input to the white board by encoding the information input to the white board in extensible Markup Language (XML); and by transmitting the encoded information to the other terminals participating in the session.

In accordance with still another aspect of the present invention, a conference method of a terminal participating in a session maintained by at least two terminals in a video conference system using a white board is provided, the method including: detecting whether a buffering mode has been selected when another terminal participating in the session has been requested to prevent input of information to the white board for a set time period; receiving and storing information upon the buffering mode being selected; and transmitting the stored information to the other terminals participating in the session upon input of information to the white board being allowed after the set time period has elapsed.

Transmitting the stored information to the other terminals participating in the session preferably includes encoding the information in extensible Markup Language (XML).

Transmitting the stored information to the other terminals participating in the session preferably includes obtaining priority and transmitting the stored information to the other terminals upon input of information being allowed after the set time period has elapsed.

In accordance with a further aspect of the present invention, a conference method of a video conference system including a first terminal and second through Nth terminals maintaining a session for a conference is provided, the method including: the first terminal requesting prevention of an input of further information to a white board during a set time period from when information has been input to the white board; and the second through Nth terminals receiving and storing further information upon a buffering mode being selected in a locked state, and transmitting the further information to other terminals participating in the session upon input of information to the white board being allowed after the set time period has elapsed.

The method preferably further includes: the first terminal encoding the information input to the white board in extensible Markup Language (XML) and transmitting the encoded information; and decoding, at the second through Nth terminals, the information encoded in XML and outputting the decoded information.

The method preferably further includes: the second through Nth terminals encoding the further information in extensible Markup Language (XML) and transmitting the encoded further information to the other terminals participating in the session; and the first terminal decoding the further information encoded in XML and outputting the decoded information.

Transmitting the further information to the other terminals participating in the session preferably includes allowing the second through Nth terminals with priority to transmit the further information, input during the buffering mode, to the other terminals participating in the session upon the input of information to the white board being allowed after the set time period has elapsed.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein:

FIG. 3 is a flowchart of an example of an information transmission method of a terminal in a video conference system according to an exemplary embodiment of the present invention; and FIG. 4 is a flowchart of another example of an information transmission method of a terminal in a video conference system according to an exemplary embodiment of the present invention.

DETAILED DESCRIPTION OF THE INVENTION

Hereinafter, exemplary embodiments of the present invention are described in detail with reference to the accompanying drawings. For the sake of clarity and conciseness, matters related to the present invention which are well known in the art have not been described in detail.

Figure 1:
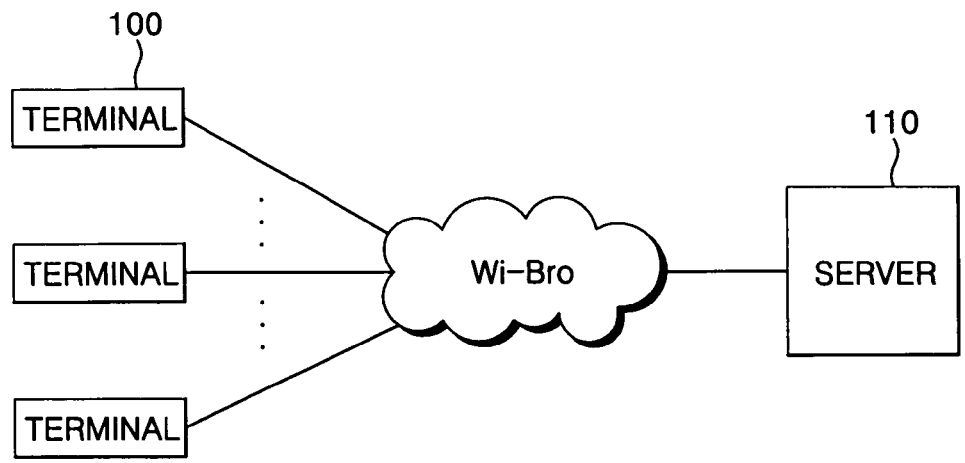
FIG. 1 is a view of the configuration of a network connection in a video conference system according to an exemplary embodiment of the present invention.

FIG. 1 is a view of the configuration of a network connection in a video conference system according to an exemplary embodiment of the present invention.

As illustrated in FIG. 1, the video conference system according to the present invention includes at least one terminal 100 and a server 110. The terminal 100 and the server 110 are connected to the Wireless Broadband Internet.

The server 110 manages a session for a multipoint conference between at least two terminals. In other words, the server 110 manages the addition and deletion of terminals participating in the multipoint conference and broadcasts data generated by a given terminal participating in the multipoint conference to other terminals participating in the session. Thus, the terminals participating in the multipoint conference session exchange data through the server 110.

However, a terminal participating in a point-to-point conference session can also exchange information directly with another terminal without the server 110.

The terminal 100 participating in a session for a conference with at least one other terminal transmits a locked packet to at least one other terminal when a given object (referred to below as "first object") has been input to the white board shared by the terminals participating in the session.

The locked packet is a packet preventing terminals other than the terminal 100 from inputting another object (referred to below as "second object") to the shared white board during a set time period. The locked packet includes time information on when the first object has been input to the shared white board and time information set for preventing an input of the second object to the shared white board by terminals other than the terminal 100.

In other words, the terminals other than the terminal 100, upon receipt of the locked packet, prevent the input of the second object to the white board of their display device during a set time period from the input of the first object to the white board by the terminal 100.

The terminal 100 encodes properties (color, etc.) and coordinates of the first object on the white board in extensible Markup Language (XML), and transmits the encoded information to the other terminals.

The other terminals decode the first object, encoded in XML and transmitted from the terminal 100, and display the decoded object on the white boards of their display device.

On the other hand, the terminal 100 is allowed to input the second object to the white board. To do so, the terminal 100 encodes properties and coordinates of the second object as well as a time when the second object has been input in XML, and transmits the encoded properties, coordinates and time to the other terminals during a set time period from when the second object has been input.

Accordingly, the other terminals decode the second object encoded in XML, display the decoded object on the white board, and prevent an input of yet another object (referred to below as "third object") to the white board during the set time period from when the second object has been input.

In other words, the other terminals prevent the input of the third object to the white board during the set time period from the input of the second object to the white board.

However, the terminal 100 alone is able to input the third object to the white board and to transmit it to the other terminals during the set time period from when the first object has been input.

When a buffering mode has been selected, the other terminals request input of any objects shared between terminals excluding themselves, and store the input information during the set time period from when the second object has been input.

When the set time period from the input of the first object has elapsed, when the set time period from the input of the second object has elapsed, or when the set time period from the input of a second or third object by the terminal 100 exceeds a set floor time limit, one of the terminals other than the terminal 100 obtains priority and encodes an input object in XML according to the selection of the buffering mode.

The terminal with priority then transmits the object encoded in XML and input according to the selection of the buffering mode to other terminals including the terminal 100.

The set floor time limit is set to prevent any one terminal from using the white board too long.

Figure 2:
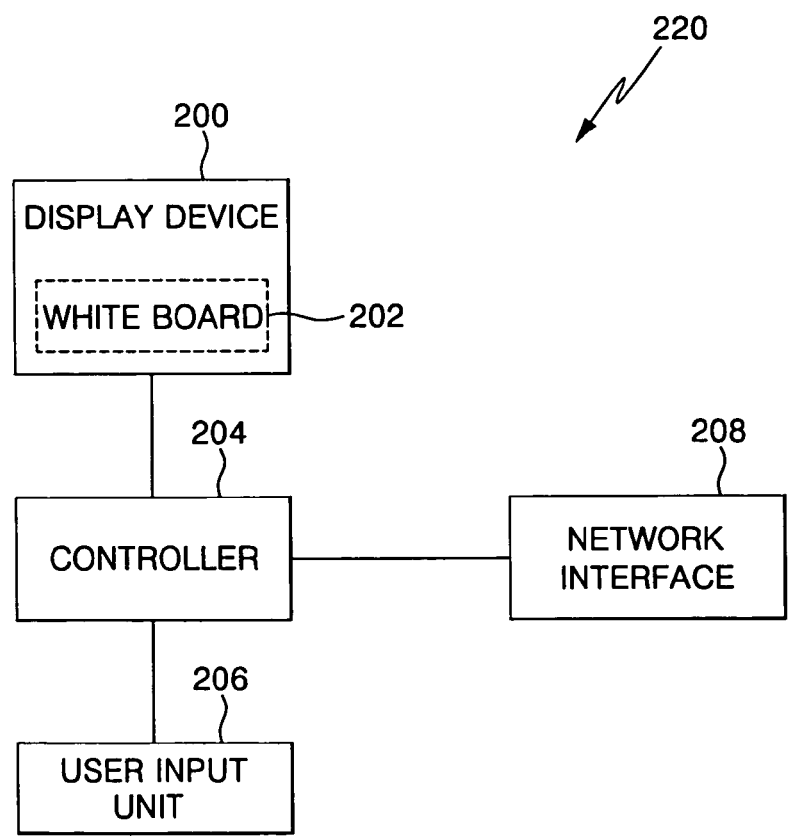
FIG. 2 is a block diagram of a terminal according to an exemplary embodiment of the present invention.

FIG. 2 is a block diagram of a terminal used for a video conference in a video conference system according to an exemplary embodiment of the present invention.

As illustrated in FIG. 2, a terminal 220 according to the present invention includes a display device 200, a controller 204, a user input unit 206, and a network interface 208.

The display device 200 includes a white board 202 for receiving and displaying an object shared with at least one other terminal participating in a conference session.

The white board 202 is displayed on the display device of at least one terminal participating in the conference session.

The controller 204 determines if a given object (first object) has been input to the white board 202 while the terminal 220 is participating in the conference session with at least one other terminal and transmits a locked packet to the other terminals participating in the session via a network interface 208 upon the first object being input to the white board 202.

The locked packet prevents the input of an object to the white board 220 from the other terminals participating in the session, excluding the terminal 220, during a set time period and includes time information on when the first object has been input to the white board and time information set for preventing the input of another object (second object) to the shared white board by terminals other than terminal 220.

Therefore, the other terminals participating in the session, upon receiving the locked packet, prevent the input of a second object to white boards of their display device during the set time period from when the first object has been input to the white board 202.

The controller 204 then encodes the properties and coordinates of the first object (including colors, etc.) input to the white board 202 in XML and transmits the encoded information to the other terminals participating in the session via the network interface 208.

The other terminals participating in the session then decode the first object, encoded in XML and transmitted from the terminal 220, and display the decoded information on the white boards of their display device.

When a second object has been input to the white board by the terminal 220 during the set time period after the first object has been input to the white board 202, the controller 204 encodes the properties and coordinates of the second object and the time when the second object has been input in XML, and transmits the encoded properties, coordinates and time to the other terminals participating in the session.

Accordingly, the other terminals participating in the session, excluding the terminal 220, decode the second object encoded in XML, display the decoded information on the white boards of their display device, and prevent an input of yet another object (third object) to the white boards of their display device during the set time period from when the second object has been input.

In other words, the other terminals participating in the session, excluding the terminal 220, prevent the input of a third object to the white boards of their display devices during the set time period from when the second object has been input after the first object has been input to the white board 202.

However, the controller 204 allows an input of a third object to the white board 202 by the terminal 220 during the set time period from when the second object has been input after the first object has been input to the white board 202, and transmits the input third object to the other terminals participating in the session via the network interface 208.

Upon a buffering mode being selected, the other terminals participating in the session, not including the terminal 220, request an input of any objects shared between terminals excluding themselves, and store the input information during the set time period from when the second object has been input.

When the set time period from input of the first object has elapsed, when the set time period from input of the second object has elapsed, or when the set time period from input of a second or third object by the terminal 220 exceeds a set floor time limit, one of the terminals other than the terminal 220 obtains priority and encodes an input object in XML according to the selection of the buffering mode.

The terminal with priority then transmits the object encoded in XML and input according to the selection of the buffering mode to the other terminals including the terminal 220.

The set floor time limit is set to prevent any one terminal from using the white board 202 too long.

The above description of a configuration of the terminal 220 refers to the case when at least the first object is transmitted from the terminal 220 to the other terminals participating in the session.

The operations performed when the terminal 220 receives the locked packet from another terminal participating in the session are as follows.

The controller 204 prevents the input of a second object to the white board 202 of the display device 200 during the set time period from when the first object has been input to the white board, which is included in the locked packet, to when it receives the locked packet from the terminal participating in the session through the network interface 208.

The controller 204 then decodes the received object encoded in XML and displays the decoded object on the white board 202 of the display device 200.

The controller 204 also decodes a second object encoded in XML and received from the terminal participating in the session, and displays the decoded second object on the white board 202 of the display device 200 when it receives the properties and coordinates of the second object and the time when the second object is input during the set time period from when the first object is input.

In addition, the controller 204 prevents an input of a third object to the white board 202 of the display device 200 during the set time period from when the second object has been input to the white board of the terminal participating in the session.

Furthermore, the controller 204 determines if the buffering mode has been selected during the set time period from when the second object has been input after the first object has been input to the white board of the terminal participating in the session. The buffering mode is selected via the user input unit 206.

The controller 204 requests the input of an object shared with terminals participating in the session other than the terminal 200 through the display device 200 and stores the input information.

When the set time period from the input of the first object has elapsed, when the set time period from the input of the second object has elapsed, or when the set time period from the input of a second or third object exceeds a set floor time limit, the controller 204 of the terminal 220 obtains priority and encodes an input object in XML according to the selection of the buffering mode.

The controller 204 transmits the corresponding object encoded in XML to the other terminals participating in the session.

FIG. 3 is a flowchart of a data transmission method of a terminal in a video conference system according to an exemplary embodiment of the present invention.

As illustrated in FIG. 3, in steps S300 and S302, a terminal participating in a session for a conference with at least one terminal determines if a first object has been input to a white board shared by terminals participating in the session.

In step S304, the terminal transmits the locked packet to the terminals participating in the session when it has been determined that the first object has been input to the white board.

The locked packet includes information on the white board to prevent an input of a second object to the white board by other terminals participating in the session during a set time period, and includes time information on when the first object has been input and time information set for preventing the input of a second object by other terminals participating in the session.

Upon receipt of the locked packet, other terminals participating in the session prevent an input of an object to the white board of their display device during the set time period from when the first object has been input to the white board.

Then, in step S306, the terminal encodes the properties (including colors) and coordinates of the first object input to the white board in XML, and transmits the encoded first object to other terminals participating in the session.

Furthermore, other terminals participating in the session decode the received first object encoded in XML and display the decoded object on the white boards of their display devices.

The terminal determines when its allotted time to use the white board has elapsed in step S308.

When the terminal's allotted time to exclusively use the white board has elapsed, the terminal generates an unlocked packet and transmits it to other terminals participating in the session so that an object can be input to the white board, in step S312.

However, when the terminal's time to exclusively use the white board has not elapsed, the terminal determines if another object has been input to the white board while the white board can still be used exclusively, in step S310.

When another object has been input while the white board can be exclusively used, the terminal performs step S306 and encodes the corresponding object input in XML, and transmits the encoded object to other terminals participating in the session.

When another object has not been input while the white board can be exclusively used, the terminal repeats step S308.

FIG. 4 is a flowchart of a data transmission method of a terminal in a video conference system according to an exemplary embodiment of the present invention.

As illustrated in FIG. 4, in steps S400 and S402, the terminal determines if the locked packet has been transmitted from another terminal participating in a session with at least one terminal while it participates in the session.

The locked packet received from the given terminal participating in the session includes information to prevent an input of another object to the white board by terminals other than the given terminal during a set time period, time information on when a first object has been input to the white board and information on the set time period.

In step S404, the terminal stays locked to prevent an input of a second object to the white board of its display device during the set time period from when the first object was input.

In step S406, the terminal decodes the object encoded in XML and received from the given terminal, and displays the decoded object on the white board of its display device.

The terminal can receive an object in the selected buffering mode and store the object in a buffer (not shown) after it receives the locked packet from the given terminal.

Then, in step S408, the terminal determines if it is in an unlocked state, which enables an input of an object to the white board where information is shared with other terminals participating in the session.

The unlocked state can occur in one of the following cases: when the set time period from when the first object has been input has elapsed, when the set time period from when a second object has been input has elapsed, or when the set time period from when a second or third object has been input exceeds a floor time limit set to prevent one terminal from using the white board too long.

In step S410, the terminal determines if the buffering mode has been enabled in the locked state when the terminal is in the unlocked state.

In step S412, the terminal encodes the object input in the buffering mode in XML, and transmits the encoded object to other terminals participating in the session, when the buffering mode has been enabled in the locked state.

As described above, in the video conference system and method using a white board according to the present invention, it is possible to conduct a multipoint conference smoothly by requesting other terminals participating in a session to prevent an input of information to the white board during a set time period whenever information has been input to the white board, by buffering information when the buffering mode is selected while the terminals participating in the session are requested to prevent an input of information to the white board, and by transmitting the buffered information to other terminals participating in the session after the set time period.

Also, in the video conference system using the white board and method thereof according to the present invention, it is possible to conduct a multipoint conference that requires real-time processing by encoding data input to the white board in XML and transmitting the encoded data.

While the present invention has been described with reference to exemplary embodiments thereof, it will be understood by those skilled in the art that various modifications in form and detail can be made therein without departing from the scope of the present invention as defined by the following claims.

What is claimed is:

1. A terminal to participate in a session in a video conference system using a white board, the terminal comprising:
   a controller to generate and to transmit a request for requesting other terminals participating in the session to prevent input of information to the white board during a first time period from a time first information is input to the white board by the terminal,
   wherein, when receiving requests generated and transmitted from the other terminals to prevent input of information to the white board during a second time period, the controller selects a buffering mode, and transmits second information to the other terminals participating in the session in response to input of information to the white board being allowed and in response to completion of the second time period.

2. The terminal of claim 1, wherein the controller encodes the first information input to the white board and the second information input during the buffering mode in eXtensible Markup Language (XML), and transmits the encoded information to the other terminals participating in the session.

3. The terminal of claim 1, wherein the controller, in response to obtaining priority, transmits, to the other terminals participating in the session, the second information input during the buffering mode in response to completion of the second time period.

4. A video conference system using a white board, the system comprising:
   a first terminal and at least one other terminal maintaining a session for a conference,
   wherein the first terminal generates and transmits a request requesting the at least one other terminal to prevent input, by the at least one other terminal, of information to the white board during a time period from a time first information is input to the white board, and
   wherein one of the at least one other terminal transmits, to other terminals participating in the session, second information input during a buffering mode selected in an unlocked state in response to input of information to the white board being allowed and in response to completion of the time period.

5. The system of claim 4, wherein the first terminal encodes the first information input to the white board in eXtensible Markup Language (XML) and transmits the encoded information to the other terminals participating in the session, and wherein the at least one other terminal decodes the information encoded in XML and outputs the decoded information.

6. The system of claim 4, wherein the one of the at least one other terminal encodes the second information in eXtensible Markup Language (XML) and transmits the encoded information to the other terminals participating in the session, and wherein the first terminal decodes the information encoded in XML and outputs the decoded information.

7. The system of claim 4, wherein the one of the at least one other terminal with priority transmits, to the other terminals participating in the session, the input of the second information during the buffering mode in response to input of information to the white board being allowed and in response to completion of the time period.

8. A conference method of a terminal participating in a session in a video conference system using a white board, the method comprising:
   generating and transmitting, by the terminal, a request for requesting other terminals participating in a session with the terminal, to prevent input of second information to a white board by the other terminals participating in the session during a time period from a time first information is input to the white board,
   wherein the request is transmitted to the other terminals.

9. The method of claim 8, wherein requesting to prevent the input of second information to the white board by the other terminals participating in the session comprises:
   encoding the first information input to the white board in XML; and
   transmitting the encoded information to the other terminals participating in the session.

10. A conference method of a terminal participating in a session in a video conference system using a white board, the method comprising:
    transmitting, from a first terminal to a second terminal, a request to prevent input of information to a white board by the second terminal during a time period, the first terminal and the second terminal participating in a session;
    determining whether a buffering mode is selected in response to the second terminal receiving the request transmitted from the first terminal;
    receiving and storing information in response to the buffering mode being selected; and
    transmitting the stored information to other terminals participating in the session in response to input of information to the white board being allowed and in response to completion of the time period.

11. The method of claim 10, wherein transmitting the stored information to the other terminals participating in the session comprises encoding the information in eXtensible Markup Language (XML).

12. The method of claim 10, wherein transmitting the stored information to the other terminals participating in the session comprises obtaining priority and transmitting the stored information to the other terminals in response to input of information to the white board being allowed and in response to completion of the time period.

13. A conference method of a video conference system comprising a first terminal and at least one other terminal in a session for a conference, the method comprising:
    generating and transmitting, by a first terminal, a request for requesting at least one other terminal to prevent an input of information to a white board during a time period from a time first information is input to the white board by the first terminal;
    receiving and storing, by the at least one other terminal, second information in response to selection of a buffering mode in a locked state; and
    transmitting, by one of the at least one other terminal, the second information in response to input of information to the white board being allowed and in response to completion of the time period.

14. The method of claim 13, further comprising:
    encoding, by the first terminal, the first information input to the white board in eXtensible Markup Language (XML);
    transmitting, by the first terminal, the encoded information; and decoding, at the at least one other terminal, the information encoded in XML and outputting the decoded information.

15. The method of claim 13, further comprising:

encoding, by the one of the at least one terminal, the second information in eXtensible Markup Language (XML) and transmitting the encoded second information to other terminals participating in the session; and decoding, by the first terminal, the second information encoded in XML and outputting the decoded information.

16. The method of claim 13, wherein transmitting the second information comprises allowing the one of the at least one other terminal with priority to transmit the second information input during the buffering mode to other terminals participating in the session in response to input of information to the white board being allowed and in response to completion of the time period.

* * * * *